United States Patent
Fan et al.

(10) Patent No.: US 12,449,489 B2
(45) Date of Patent: Oct. 21, 2025

(54) THREE-AXIS HALL ANGLE SENSOR WITH ACCURACY OF 0.3°

(71) Applicant: University of Electronic Science and Technology of China, Chengdu (CN)

(72) Inventors: Hua Fan, Chengdu (CN); Huichao Yue, Chengdu (CN); Yiming Hu, Chengdu (CN); Guo Li, Chengdu (CN); Jing Luo, Chengdu (CN); Panfeng Zhao, Chengdu (CN); Quanyuan Feng, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 154 days.

(21) Appl. No.: 18/527,347

(22) Filed: Dec. 3, 2023

(65) Prior Publication Data

US 2024/0410961 A1    Dec. 12, 2024

(30) Foreign Application Priority Data

Jun. 12, 2023    (CN) .......................... 202310693285.0

(51) Int. Cl.
  *G01R 33/02*    (2006.01)
  *G01R 33/07*    (2006.01)

(52) U.S. Cl.
  CPC ....... *G01R 33/0206* (2013.01); *G01R 33/077* (2013.01)

(58) Field of Classification Search
  CPC ................ G01R 33/02; G01R 33/0206; G01R 33/06–098; G01D 5/12; G01D 5/14; G01D 5/142; G01D 5/145; G01D 5/16
  See application file for complete search history.

(56) References Cited

U.S. PATENT DOCUMENTS

| | | | |
|---|---|---|---|
| 2012/0016614 A1* | 1/2012 | Hohe | G01R 33/075 324/202 |
| 2015/0241523 A1* | 8/2015 | Scherr | G01R 33/077 324/244 |
| 2016/0209480 A1* | 7/2016 | Hioka | G01R 33/075 |

* cited by examiner

*Primary Examiner* — Huy Q Phan
*Assistant Examiner* — David B Frederiksen
(74) *Attorney, Agent, or Firm* — MATTHIAS SCHOLL P.C.; Matthias Scholl (57) ABSTRACT

Disclosed is a three-axis Hall angle sensor with an accuracy of 0.3°. The sensor is mainly designed by means of finite element software and COMSOL Multiphysics. The present specification will be mainly performed in three steps. In the first step, a cross-shape horizontal Hall element for measuring the magnetic field in the vertical direction, that is, the direction z, is studied. The second section mainly studies a three-contact four-Hall vertical element for measuring the magnetic field in the directions x, y. The third part is to design the angle sensor. Compared with the horizontal Hall element, the vertical Hall element has a relatively large offset, therefore, four vertical Hall elements are used to measure the magnetic field in the horizontal direction, and two complementary vertical structures are used to eliminate the error when the magnetic field in the same horizontal direction is measured.

2 Claims, 9 Drawing Sheets

THREE-AXIS HALL ANGLE SENSOR WITH ACCURACY OF 0.3°

CROSS-REFERENCE TO RELATED APPLICATIONS

Pursuant to 35 U.S.C. § 119 and the Paris Convention Treaty, this application claims foreign priority to Chinese Patent Application No. 202310693285.0 filed Jun. 12, 2023, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the fields of microelectronics and solid-state electronics, and in particular, to a three-axis Hall angle sensor.

Single-axis Hall sensor is the oldest Hall sensor, and the single-axis Hall sensor can only measure one specific direction of the magnetic field, which makes the application of the single-axis Hall sensor quite limited. In recent years, with the development of some new technologies, a Hall angle sensor capable of measuring multiple magnetic field directions has begun to be studied. For implementing a three-axis Hall sensor, there are three commonly used solutions:

Solution 1: using three identical horizontal Hall elements placed in the X, Y, and Z planes to realize the measurement of the three-dimensional magnetic field;

Solution 2: using one horizontal Hall element and two vertical Hall elements in combination as a multi-device solution, in which the horizontal Hall element is used to measure a magnetic field perpendicular to a chip surface, and the vertical Hall element is used to measure a magnetic field parallel to the chip surface;

Solution 3: using a Magnetic Concentrator Thin Disk and four identical horizontal Hall elements; the magnetic concentrator technology can convert the magnetic field from horizontal direction to vertical direction so that the horizontal magnetic field being converted can be measured by the horizontal Hall elements.

Each of the three solutions has advantages and disadvantages. In solution 1, the horizontal acquisition element has a high sensitivity, and can well sense magnetic fields in various directions. However, the three elements have to be aligned along the coordinate axes required to be measured, and at the same time, the three Hall elements that work independently need to be kept at a relatively close physical distance. This three-axis sensor is difficult to manufacture and has a relatively high cost. In solution 2, both the horizontal Hall element and the vertical Hall element can be achieved by using a standard CMOS process without additionally adding other processes, which effectively reduces the production cost. However, the vertical Hall structure for measuring a magnetic field in a horizontal direction exhibits lower sensitivity and higher offset, and therefore requires a separate signal conditioning circuit for compensation. In solution 3, the magnetic concentrator technology enables the measurement of external magnetic fields in the X, Y, and Z axes to be completely realized with horizontal Hall sensors placed in the same plane. The magnetic concentrators are usually manufactured by using special processes and materials, and the placement of the magnetic concentrator and the horizontal Hall element should be highly accurate.

Chinese Patent Application No. 2022101609219 discloses a three-axis Hall angle sensor. In the patent, four vertical Hall elements are used to measure the magnetic field in a horizontal direction, and two complementary vertical structures are used to eliminate the error when the same magnetic field in the horizontal direction is measured. The area of the three-axis Hall angle sensor is only 142×142 $\mu m^2$, which achieves the performance that an angle error between a magnetic field direction and an xy-plane is less than 0.2°, and an angle error between an x-axis and the projection of the magnetic field direction on the xy-plane is less than 0.05°. However, the disclosure does not consider the change in the thickness of the N-well caused by the reverse bias PN junction during the operation of the Hall elements, and the influence of the magnetic field in other directions on the obtained Hall voltage is neglected in the transmission equation, and the obtained result is not completely accurate.

SUMMARY

To solve the problem existing in conventional three-axis Hall sensors, the disclosure provides a novel three-axis Hall sensor.

The technical solution of the disclosure is a three-axis Hall angle sensor with an accuracy of 0.3°. The sensor comprises: four horizontal Hall elements and eight vertical Hall elements disposed on a plane, wherein the eight vertical Hall elements are divided into two groups, an X-direction group and a Y-direction group, the X-direction group comprises four vertical Hall elements in total: X1, X2, X3 and X4, and the Y-direction group comprises four vertical Hall elements in total: Y1, Y2, Y3 and Y4; each vertical Hall element comprises four three-contact Hall components, and the four three-contact Hall components are connected end-to-end in series; four horizontal Hall elements are arranged in an array of 2×2, comprising: Z1, Z2, Z3 and Z4; in the X-direction group, X1 and X2 are located on the left side of the four horizontal Hall elements, X2 is located between X1 and the four horizontal Hall elements, X3 and X4 are located on the right side of the four horizontal Hall elements, and X3 is located between X4 and the four horizontal Hall elements;

X1 comprises four three-contact Hall components, in which the middle electrodes are $A_{X1}$, $B_{X1}$, $C_{X1}$, $D_{X1}$ in sequence; X2 comprises four three-contact Hall components, in which the middle electrodes are $A_{X2}$, $B_{X2}$, $C_{X2}$, $D_{X2}$ in sequence; X3 comprises four three-contact Hall components, in which the middle electrodes are $A_{X3}$, $B_{X3}$, $C_{X3}$, $D_{X3}$ in sequence; X4 comprises four three-contact Hall components, in which the middle electrodes are $A_{X4}$, $B_{X4}$, $C_{X4}$, $D_{X4}$ in sequence; when measuring the X-direction magnetic field, for the first vertical Hall element X1, applying a current bias between the contact electrodes of $A_{X1}$ and $C_{X1}$, and measuring a Hall voltage $V_{HallX1}$ between the contact electrodes of $A_{X2}$ and $C_{X2}$; measuring the second vertical Hall element X2 of the magnetic field in the X direction, applying a current bias between the contact electrodes of $D_{X2}$ and $B_{X2}$, and simultaneously measuring a Hall voltage $V_{HallX2}$ generated between $A_{X2}$ and $C_{X2}$; for the third vertical Hall element X3, applying a current bias between the contact electrodes of $C_{X3}$ and $A_{X3}$, measuring a Hall voltage $V_{HallX3}$ between the contact electrodes of $B_{X3}$ and $D_{X3}$; for the fourth vertical Hall element X4, applying a current bias between the $A_{X4}$ and $C_{X4}$ contact electrodes, measuring a Hall voltage $V_{HallX4}$ between the contact electrodes of $D_{X4}$ and $B_{X4}$;

in the Y direction, Y1 and Y2 are located on the upper side of the four horizontal Hall elements, Y2 is located between Y1 and the four horizontal Hall elements, Y3 and Y4 are located on the lower side of the four horizontal Hall elements, and Y3 is located between Y4 and the four horizontal Hall elements; Y1 comprises four three-contact Hall components, in which the middle electrodes are $A_{Y1}$, $B_{Y1}$, $C_{Y1}$, $D_{Y1}$ in sequence; Y2 comprises four three-contact Hall components, in which the middle electrodes are $A_{Y2}$, $B_{Y2}$, $C_{Y2}$, $D_{Y2}$ in sequence; Y3 comprise four three-contact Hall components, in which the middle electrodes are $A_{Y3}$, $B_{Y3}$, $C_{Y3}$, $D_{Y3}$ in sequence; Y4 comprises four three-contact Hall components, and the middle electrodes are $A_{Y4}$, $B_{Y4}$, $C_{Y4}$, $D_{Y4}$ in sequence; when measuring a magnetic field in the Y-direction, the following steps are taken: for the first vertical Hall element Y1, applying a current bias between $D_{Y1}$ and $B_{Y1}$, and measuring a Hall voltage $V_{HallY1}$ between contact electrodes of $A_{Y1}$ and $C_{Y1}$; for the second vertical Hall element Y2, applying a current bias between $B_{Y2}$ and $D_{Y2}$, and simultaneously measuring a sensing Hall voltage $V_{HallY2}$ generated between $A_{Y2}$ and $C_{Y2}$; for the third vertical Hall element Y3, applying a current bias between contact electrodes of $A_{Y3}$ and $C_{Y3}$, and measuring a Hall voltage $V_{HallY3}$ between contact electrodes of $D_{Y3}$ and $B_{Y3}$; for the fourth vertical Hall element X4, applying a current bias between the $B_{Y4}$ and $D_{Y4}$ contact electrodes, then measuring a Hall voltage $V_{HallY4}$ between contact electrodes of $C_{Y4}$ and $A_{Y4}$;

each horizontal Hall element comprises four electrodes: A, B, C and D; the first horizontal Hall element Z1, applying a bias current between electrodes $A_{Z1}$ and $C_{Z1}$, and measuring a Hall voltage $V_{HallZ1}$ generated between electrodes $D_{Z1}$ and $B_{Z1}$; for the second horizontal Hall element Z2, applying a current bias between electrodes $B_{Z2}$ and $D_{Z2}$, then measuring a Hall voltage $V_{HallZ2}$ between electrodes $A_{Z2}$ and $C_{Z2}$; for the third horizontal Hall element Z3, applying a current bias between electrodes $C_{Z3}$ and $A_{Z3}$, then measuring a Hall voltage $V_{HallZ3}$ between electrodes $B_{Z3}$ and $D_{Z3}$; for the fourth horizontal Hall element Z4, applying a current bias between electrodes $D_{Z4}$ and $B_{Z4}$, and measuring a Hall voltage $V_{HallZ4}$ between electrodes $C_{Z4}$ and $A_{Z4}$; and the four identical Hall elements, Z1, Z2, Z3, Z4, are connected together by orthogonal coupling.

Further, a transmission equation of current $J_n$ of the three-axis Hall angle sensor is:

$$J_n = J_{n0} \cdot M \quad (1)$$

$$M = \frac{1}{1+a^2+b^2+c^2}\begin{pmatrix} 1+a^2 & ab-c & ca+b \\ c+ab & 1+b^2 & bc-a \\ ca-b & a+bc & 1+c^2 \end{pmatrix} \quad (2)$$

$$a = \mu_H \cdot B_X \quad (3)$$

$$b = \mu_H \cdot B_Y \quad (4)$$

$$c = \mu_H \cdot B_Z \quad (5)$$

$J_{n0}$ represents a zero magnetic field electron current density, $\mu_H = r \cdot \mu$ and represents a Hall mobility of electrons, r is a Hall coefficient, μ represents an electron mobility, and $B_X$, $B_Y$, $B_Z$ respectively represent magnetic field components in X, Y and Z directions.

Compared with conventional technical solutions (Reference 1: F. Hua, S. Li, V. Nabaei, Q. Y. Feng, "Modeling of Three-Axis Hall Effect Sensors Based on Integrated Magnetic Concentrator," (J), IEEE Sensors, 2020, Vol. 20, no. 17, pp. 9919-9927 and Reference 2: Texas Instruments. TMAG5170, High-Precision 3D Linear Hall-Effect Sensor With SPI. Accessed: 2021 (online) Available: https://www.ti.com.cn), the disclosure has more advantages in terms of sensitivity, area and power consumption. BY means of finite element simulation, COMSOL multiphysics, the angle error between the magnetic field direction and the xy-plane is measured to be less than 0.3 degrees, and the angle error between the xy-plane projection of the magnetic field direction and the x-axis is less than 0.22 degrees.

DETAILED DESCRIPTION

The specification will be further described below with respect to the embodiments and in conjunction with the accompanying figures:

The three-axis Hall sensor is a Hall voltage converted by measuring a magnetic field B in three directions X, Y and Z, and then calculates the angle of the magnetic field. The three-axis Hall sensor of the disclosure measures the magnetic field angle using a combination of four horizontal Hall elements and eight vertical Hall elements. The horizontal Hall elements for measuring the vertical direction of the chip surface adopts a cross-shaped structure; four identical three-contact vertical Hall elements are connected in parallel to form a three-contact four-Hall structure, electrodes in the middle of the three contacts are used for providing an offset or sensing Hall voltage, and electrodes on two sides are used for connecting to electrodes of adjacent Hall elements. Since the vertical Hall element is largely misaligned, the four identical vertical Hall elements are used in measuring the same horizontal direction magnetic field.

Based on the process adopted in the model, the depth and doping concentration of the active region of the horizontal Hall element and the vertical Hall element are determined. According to the design rules provided by Foundry, the N-well active doping concentration may be of about $9.1132e^{16}$ cm$^{-3}$ and the depth of about 1.5 μm, and the deep N-well active region with the doping concentration of about 9.6664 e$^{16}$ cm$^{-3}$ and the depth of about 6 µm.

Step 1: Design of Horizontal Hall Elements

Figure 1:
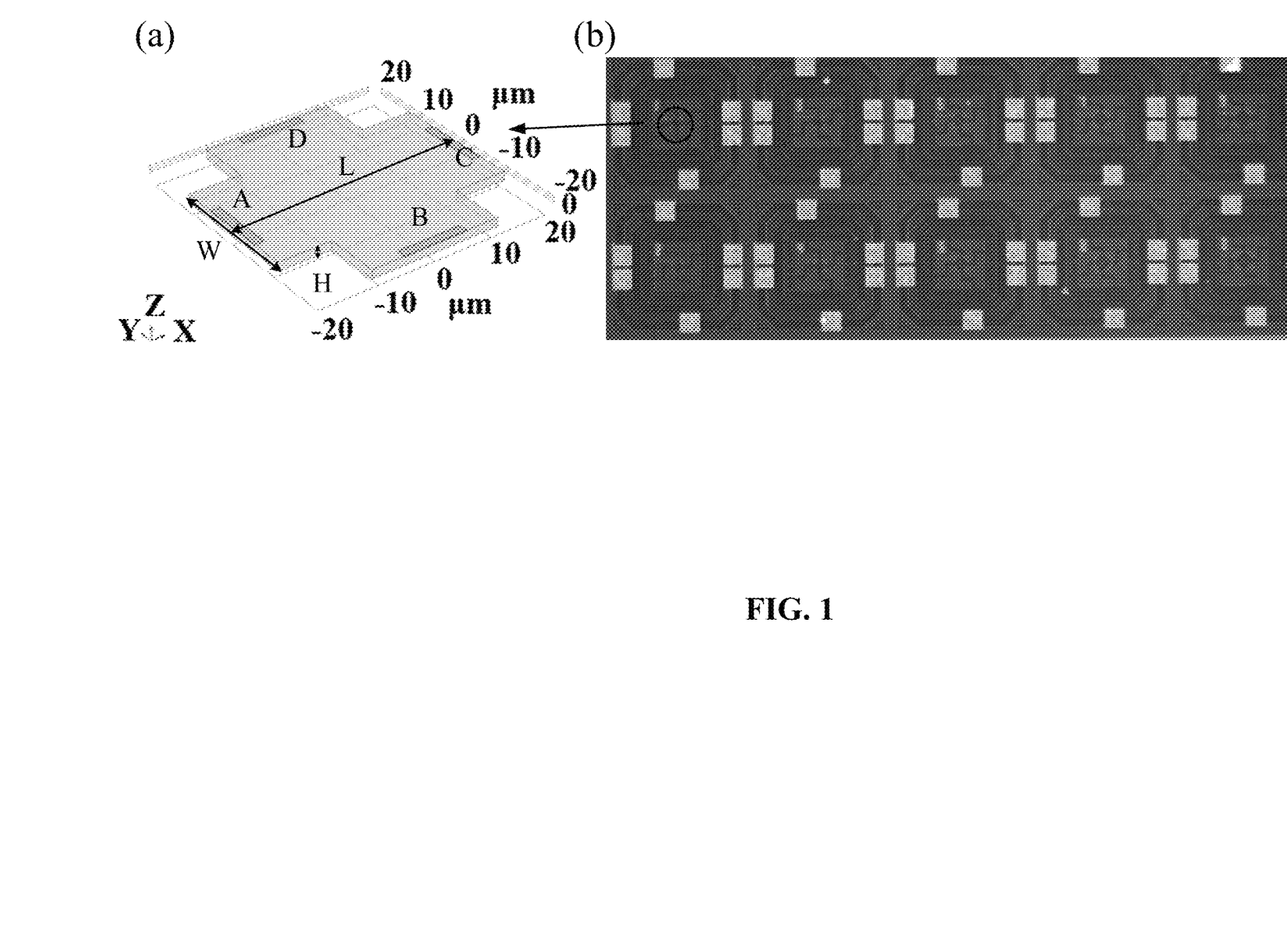
FIG. 1 is a structural diagram of a cross horizontal Hall element.

A cross-shaped Hall element as shown in FIG. 1 is constructed in a 'geometric' configuration that has good rotational symmetry. When current flows into the end A and out of the end C, Hall voltages are induced at the two ends B and D; when the end B is used as the current input end, and the end D as the current output, the voltage difference directly existing at the two ends A and C is the Hall voltage. Such a rotation symmetrical structure facilitates the design of the subsequent interface circuit, and the use of a rotating current technology can reduce the offset present in Hall elements. The geometric design parameters comprise L, W, L_C, W_C, representing the length, width, contact electrode length, and contact electrode width, respectively, of the Hall element. BY comparing different sizes of Hall elements, it is found that the performance is optimal when L, W, L_C, W_C are respectively set to be 40 µm, 24 µm, 1.5 µm, 12 µm.

A current conservation node is added in the "current (ec)" physical field, under which the Conductivity of the interface, the Constitutive Relationship and the Relative Permittivity of the displacement currents can be defined. When a magnetic field perpendicular to the direction of the current is applied to the energized conductor, carriers in the conductor deflect due to the action of the Lorentz Force, and an electric field perpendicular to the direction of the magnetic field and the current is formed. The effect of the magnetic field on the current is converted into the effect of the magnetic field on the Conductivity, establishing an anisotropic magnetic field function conductivity. For a horizontal Hall element fabricated using an N-well, its current transfer equation can be written as:

$$J_n = J_{n0} \cdot M \quad (1)$$

$$M = \frac{1}{1+a^2+b^2+c^2}\begin{pmatrix} 1+a^2 & ab-c & ca+b \\ c+ab & 1+b^2 & bc-a \\ ca-b & a+bc & 1+c^2 \end{pmatrix} \quad (2)$$

$$a = \mu_H \cdot B_X \quad (3)$$

$$b = \mu_H \cdot B_Y \quad (4)$$

$$c = \mu_H \cdot B_Z \quad (5)$$

$J_{n0}$ represents a zero magnetic field electron current density, $\mu_H = r \cdot \mu$ and represents a Hall mobility of electrons, r is a Hall coefficient, µ represents an electron mobility, and $B_X$, $B_Y$, $B_Z$ respectively represent magnetic field components in X, Y and Z directions.

Figure 2:
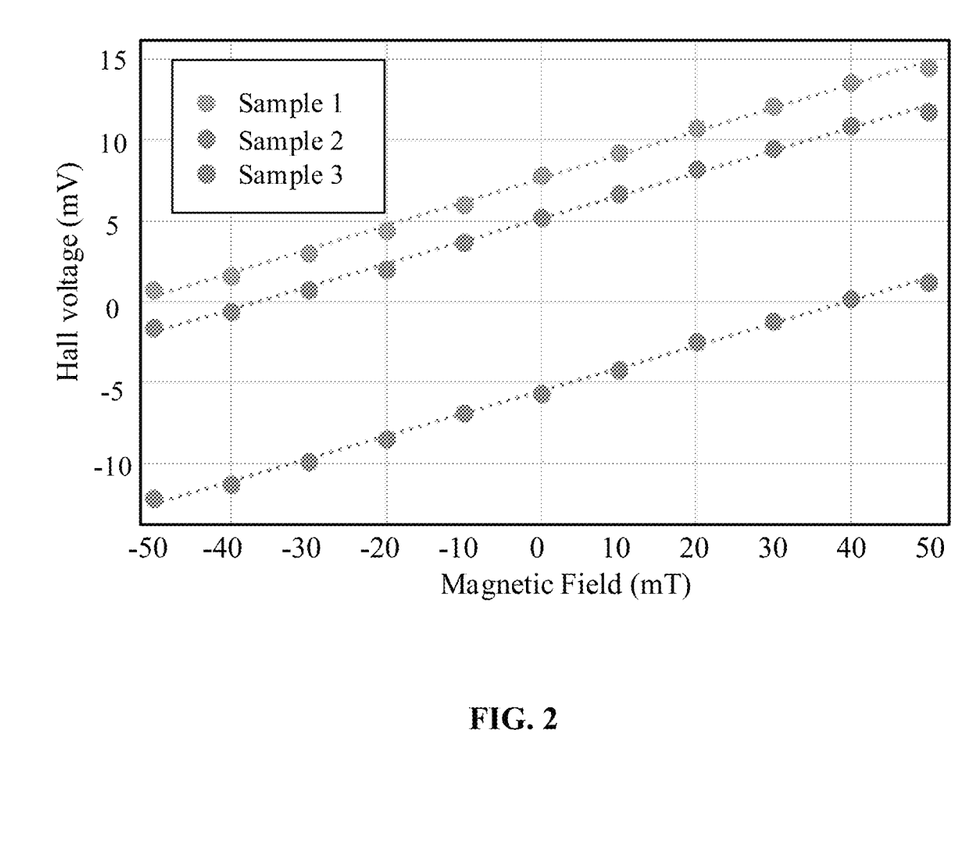
FIG. 2 illustrates a horizontal Hall element measuring the change in the magnetic field.

In COMSOL Multiphysics, "parameterized scanning" is added to study the influence of the magnetic field intensity. When the magnetic field in the $B_Z$ direction increases from 0 mT to 100 mT, the electric potential and the Hall voltage measured by the sensing electrode of the horizontal Hall element are shown in FIG. 2, and the current correlation sensitivity is 38.3 V/(A·T).

Step 2: Design of Vertical Hall Elements

Figure 3:
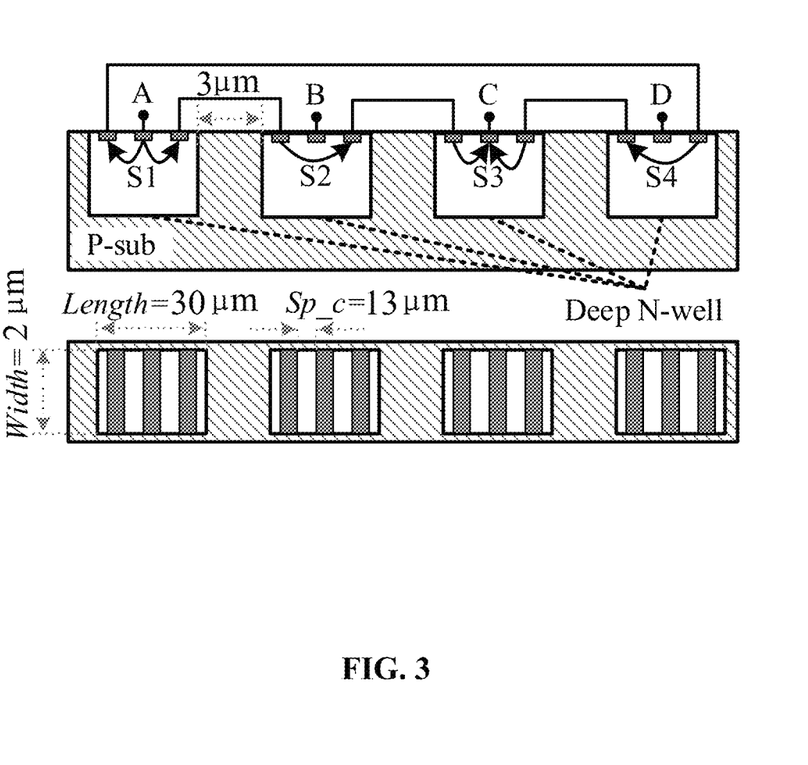
FIG. 3 is a structure diagram of a vertical Hall element which is three-contact and comprises four Hall components.

Conventional Hall elements are parallel to the chip surface for measuring the magnetic field $B_Z$ perpendicular to the sensor surface. When a magnetic field parallel to a chip surface needs to be measured, a special packaging technology is required to vertically place a horizontal Hall element, which imposes a high requirement on the precision of packaging. To solve the problem of measuring the magnetic field in a horizontal direction, various vertical Hall elements have been designed, and as shown in FIG. 3, a three-contact four-Hall vertical element is considered to be a promising structure.

A three-contact four-Hall vertical element is constructed in a 'geometric' configuration that has good rotational symmetry. When the current flows into the end A and out of the non-adjacent end C, the voltage difference generated by the two terminals B and D is the Hall voltage. When the current flows into the end B and out of the end D, the corresponding Hall voltage can be obtained by measuring the current potentials at the two ends A and C. This structure has a rotational symmetry with respect to a conventional Hall element having five contact electrodes, which facilitates design of the readout interface circuit. The geometric parameters of the vertical Hall element comprise L, W, l_c, h_c, sp_c, and sp_hall respectively represent the length, width, height, contact electrode length, contact electrode height, contact electrode spacing, and spacing between the three-contact Hall components of the vertical Hall element. BY comparing Hall components of different sizes, it is found that the performance is optimal when L, W, H, l_c, h_c, sp_c, sp_hall are set to 30 µm, 2 µm, 1 µm, 0.16 µm, 13 µm, and 3 µm, respectively.

Figure 4:
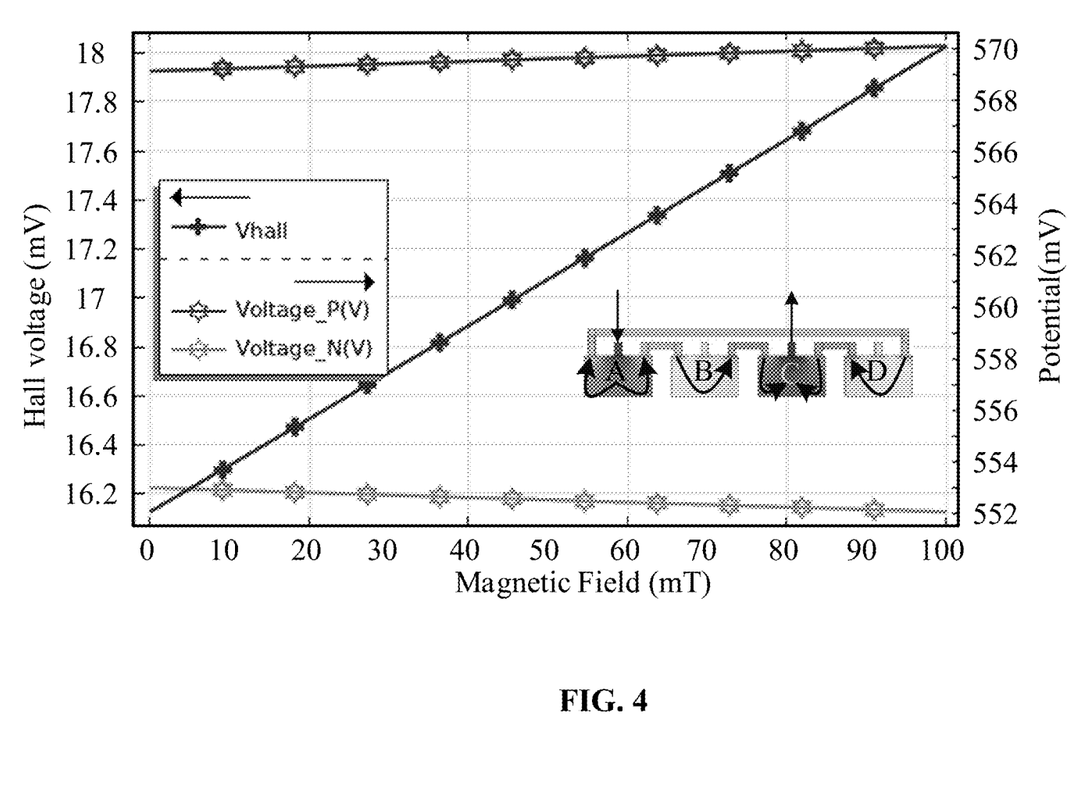
FIG. 4 shows a change of the Hall voltage when a vertical Hall element measures a magnetic field in a horizontal direction.

In COMSOL Multiphysics, "parameterized scanning" is added to study. When the magnetic field in the BY direction increases from 0 mT to 100 mT, the electric potential and the Hall voltage measured by the sensing electrode of the vertical Hall element are shown in FIG. 4, and the current correlation sensitivity is 23.9 V/(A·T).

Figure 5:
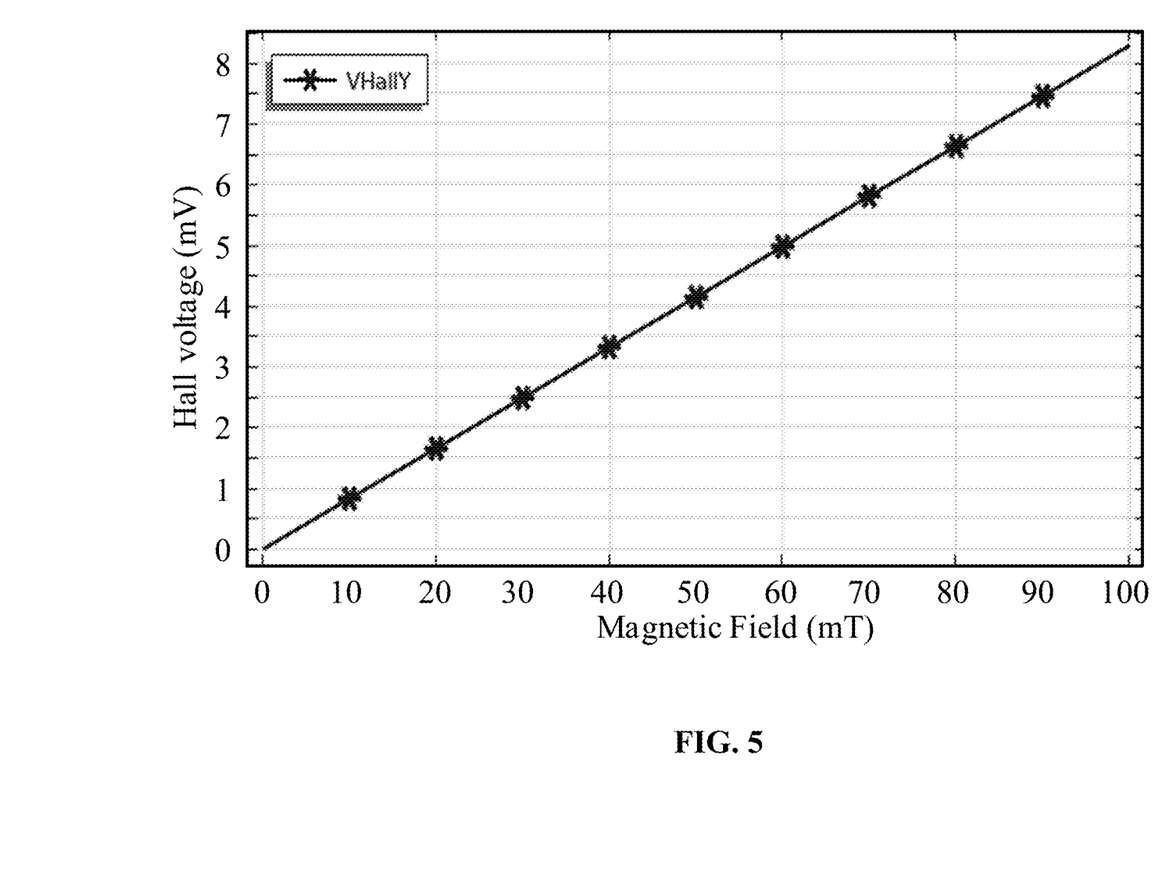
FIG. 5 is a curve of Hall voltage with magnetic field after a bi-vertical Hall element eliminates offset.

It can be found that compared with the horizontal Hall element, the three-contact four-Hall vertical element has a larger offset, therefore, when a magnetic field in the same direction is measured, four completely identical three-contact four-Hall elements can be used to be connected in a complementary manner to eliminate the offset. FIG. 5 shows the comparison of Hall voltages measured before and after calibration.

Step 3: Design of Three-Axis Hall Angle Sensor

Figure 6:
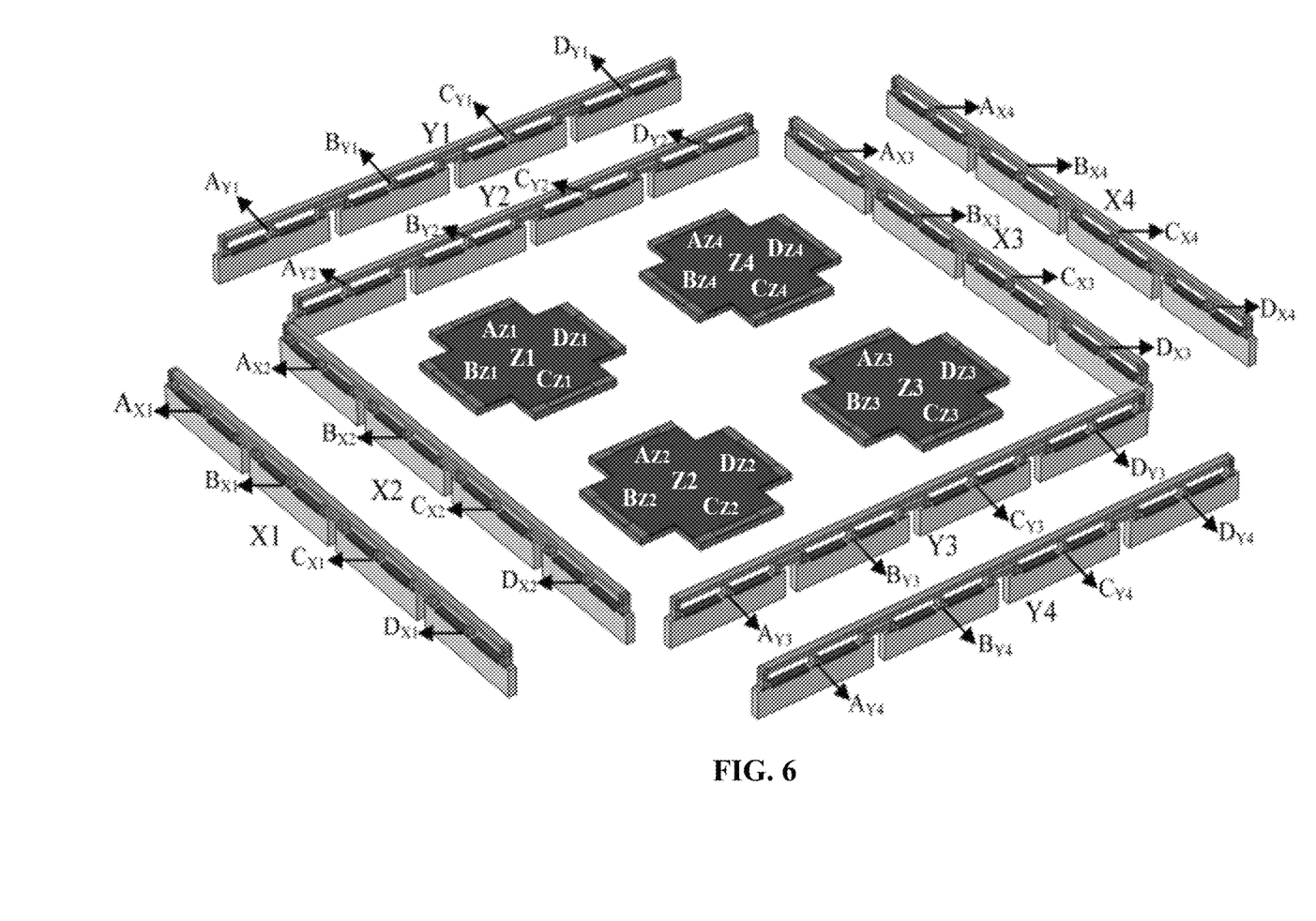
FIG. 6 illustrates a geometry structure of a three-axis Hall sensor in accordance with the disclosure.
Figure 7:
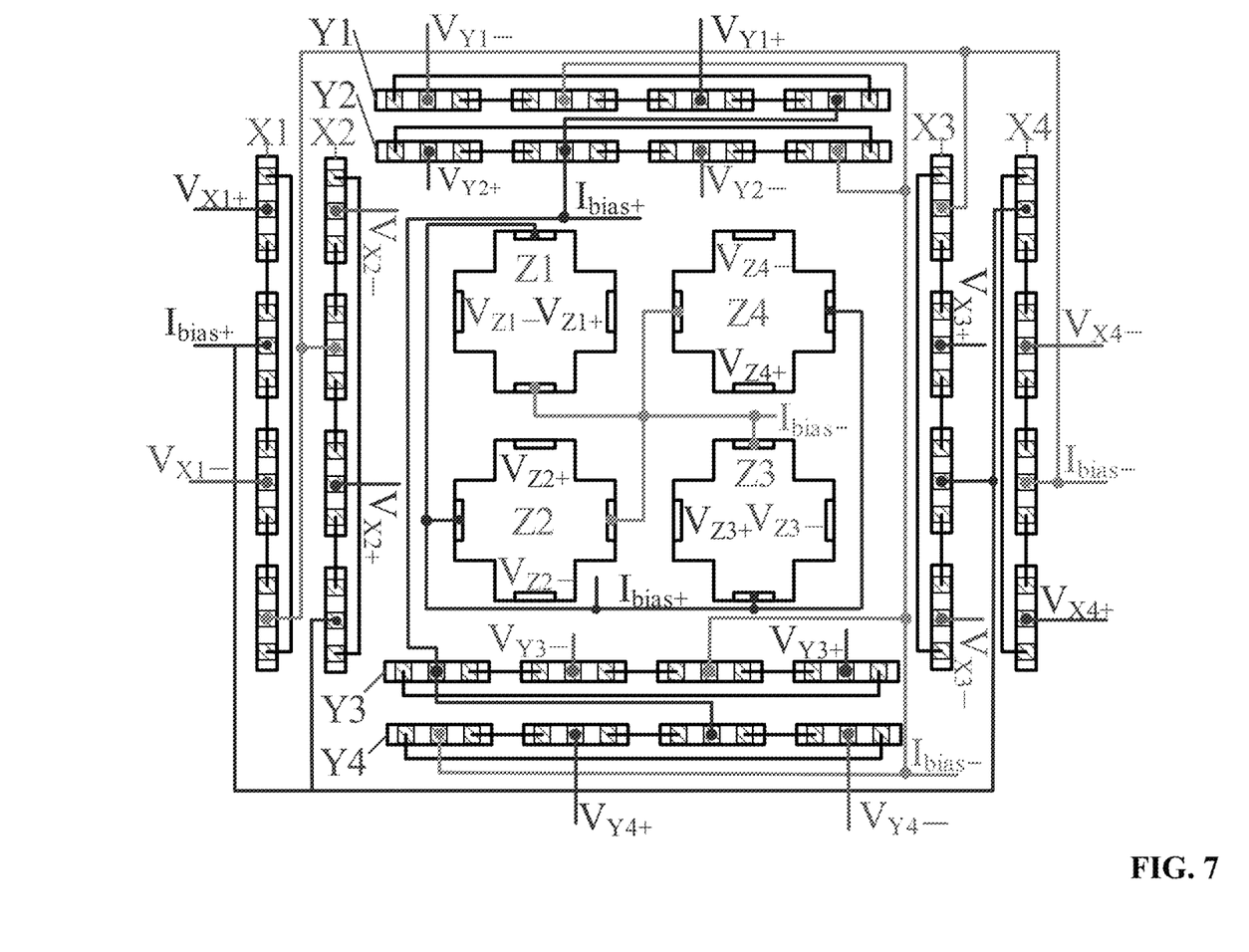
FIG. 7 illustrates a circuit connection of a three-axis Hall sensor of the disclosure.

The three-axis Hall sensor designed in the disclosure has a structure as shown in FIGS. 6 and 7 comprising eight identical three-contact four-Hall vertical elements (X1, X2, X3, X4, Y1, Y2, Y3, Y4) and four horizontal Hall elements (Z1, Z2, Z3, Z4). The vertical Hall element is used for measuring the magnetic field in the X, Y axis direction, that is, the magnetic field in the horizontal direction, and the horizontal Hall element is used for measuring the magnetic field in the Z axis direction, that is, the magnetic field in the vertical direction. As shown in FIG. 7, where X1, X2, X3 and X4 can be used to measure the magnetic field in the Bx direction.

For X1, the bias current flows in end $A_{X1}$ and out of non-adjacent end $C_{X1}$, and the Hall voltage between $B_{X1}$ and $D_{X1}$, $V_{HallX1}$, can be expressed as:

$$V_{HallX1} = V_{AX1} - V_{CX1} = S_v I_{bias} B_x + V_{offX1} \quad (6)$$

For X2, the bias current flows in end $B_{X2}$ and out of end $D_{X2}$, and the Hall voltage $V_{HallX2}$ between $A_{X2}$ and $C_{X2}$ is:

$$V_{HallX2} = V_{CX2} - V_{AX2} = S_v I_{bias} B_x + V_{offX2} \quad (7)$$

For X3, the bias current flows in end $C_{X3}$ and out of non-adjacent end $A_{X3}$, and the Hall voltage $V_{HallX3}$ between $D_{X3}$ and $B_{X3}$ can be expressed as:

$$V_{HallX3} = V_{BX3} - V_{DX3} = S_v I_{bias} B_x + V_{offX3} \quad (8)$$

For X4, the bias current flows in end $D_{X4}$ and out of end $B_{X4}$, the Hall voltage between $C_{X4}$ and $A_{X4}$, $V_{HallX4}$, is:

$$V_{HallX4} = V_{DX4} - V_{BX4} = S_v I_{bias} B_x + V_{offX4} \quad (9)$$

The vertical Hall elements Y1, Y2, Y3, and Y4 are used to measure the magnetic field in the BY direction. For the Y1 component, when a bias current is applied between $D_{Y1}$ and $B_{Y1}$, the Hall voltage $V_{HallY1}$ between $C_{Y1}$ and $A_{Y1}$ is measured as:

$$V_{HallY1} = V_{CY1} - V_{AY1} = S_v I_{bias} B_y + V_{offY1} \quad (10)$$

For the Y2 component, when a bias current is applied between $B_{Y2}$ and $D_{Y2}$, the Hall voltage $V_{HallY2}$ between $A_{Y2}$ and $C_{Y2}$ is measured as:

$$V_{HallY2} = V_{AY2} - V_{CY2} = S_v I_{bias} B_y + V_{offY2} \quad (11)$$

For the Y3 component, when a bias current is applied between $A_{Y3}$ and $C_{Y3}$, the Hall voltage $V_{HallY3}$ between $D_{Y3}$ and $B_{Y3}$ is measured as:

$$V_{HallY3} = V_{DY3} - V_{BY3} = S_v I_{bias} B_y + V_{offY3} \quad (12)$$

For the Y4 component, when a bias current is applied between $C_{Y4}$ and $A_{Y4}$, the Hall voltage $V_{HallY4}$ between $B_{Y4}$ and $D_{Y4}$ is measured as:

$$V_{HallY4} = V_{BY1} - V_{DY1} = S_v I_{bias} B_y + V_{offY4} \quad (13)$$

Horizontal element Z is used to measure the magnetic field in the vertical direction: for the first horizontal Hall component Z1, when a bias current is applied between $D_{Z1}$ and $B_{Z1}$, the Hall voltage generated between $A_{Z1}$ and $C_{Z1}$ is measured:

$$V_{HallZ1} = V_{AZ1} - V_{CZ1} = S_h I_{bias} B_z + V_{offZ1} \quad (14)$$

For the second horizontal Hall component Z2, when a bias current is applied between $A_{Z2}$ and $C_{Z2}$, the Hall voltage between $B_{Z2}$ and $D_{Z2}$:

$$V_{HallZ2} = V_{BZ2} - V_{DZ2} = S_h I_{bias} B_z + V_{offZ2} \quad (15)$$

For the third horizontal Hall component Z3, when a bias current is applied between the $B_{Z3}$ and the $D_{Z3}$, the Hall voltage between $C_{Z3}$ and $A_{Z3}$:

$$V_{HallZ3} = V_{CZ3} - V_{AZ3} = S_h I_{bias} B_z + V_{offZ3} \quad (16)$$

For the fourth horizontal Hall component Z4, when a bias current is applied between $C_{Z4}$ and $A_{Z4}$, the Hall voltage between $D_{Z4}$ and $B_{Z4}$:

$$V_{HallZ4} = V_{CZ4} - V_{AZ4} = S_h I_{bias} B_z + V_{offZ4} \quad (17)$$

$S_v$ and $S_h$ respectively represent current-related sensitivity of the vertical Hall element and the horizontal Hall element; $I_{bias}$ represents the bias current applied to the Hall element; $B_x$, $B_y$, $B_z$ denotes the x, y, z-axis component of the applied magnetic field, respectively, $V_{off}$ denotes the offset. The angular information of the external magnetic field may be determined by the angle θ between the direction of the magnetic field B and the position of the xy-plane, and the angle α between the x-axis and the projection of the magnetic field on the xy-plane. The x, y, z-axis components of the external magnetic field B are each described as:

$$B_x = B\cos\theta\cos\alpha \quad (18)$$

$$B_y = B\cos\theta\cos\alpha \quad (19)$$

$$B_z = B\sin\theta \quad (20)$$

In the study, the angle α and the angle θ can be obtained by using Hall voltage which is measured by the Hall element and the relevant sensitivity of the element.

$$\alpha = \arctan(B_y/B_x) \quad (21)$$

$$\theta = \arctan\left(B_z/\sqrt{B_y^2 + B_x^2}\right) \quad (22)$$

The obtained Hall voltage has the following relationship:

$$\frac{V_{HallY}}{V_{HallX}} = \frac{4S_v I_{bias} B_y + V_{offy}}{4S_v I_{bias} B_x + V_{offx}} \approx \frac{B_y}{B_x} \quad (23)$$

$$\frac{V_{HallZ}}{\sqrt[2]{V_{HallX}^2 + V_{HallY}^2}} = \quad (24)$$

$$\frac{4S_h I_{bias} B_z + V_{offz}}{\sqrt[2]{(4S_v I_{bias} B_y + V_{offy})^2 + (4 \times S_v I_{bias} B_x + V_{offx})^2}} \approx \frac{S_h}{S_v} \cdot \frac{B_z}{\sqrt[2]{B_x^2 + B_y^2}}$$

Substituting formula 23 to formula 21 yields:

$$\alpha \approx \arctan\left(\frac{4 \times S_v I_{bias} B_y + V_{offy}}{4 \times S_v I_{bias} B_x + V_{offx}}\right) \quad (25)$$

Substituting Formula 24 into Formula 22 yields:

$$\theta \approx \arctan\left(\frac{S_v}{S_h} \cdot \frac{V_{HallZ}}{\sqrt{V_{HallX}^2 + V_{HallY}^2}}\right) \quad (26)$$

Figure 8:
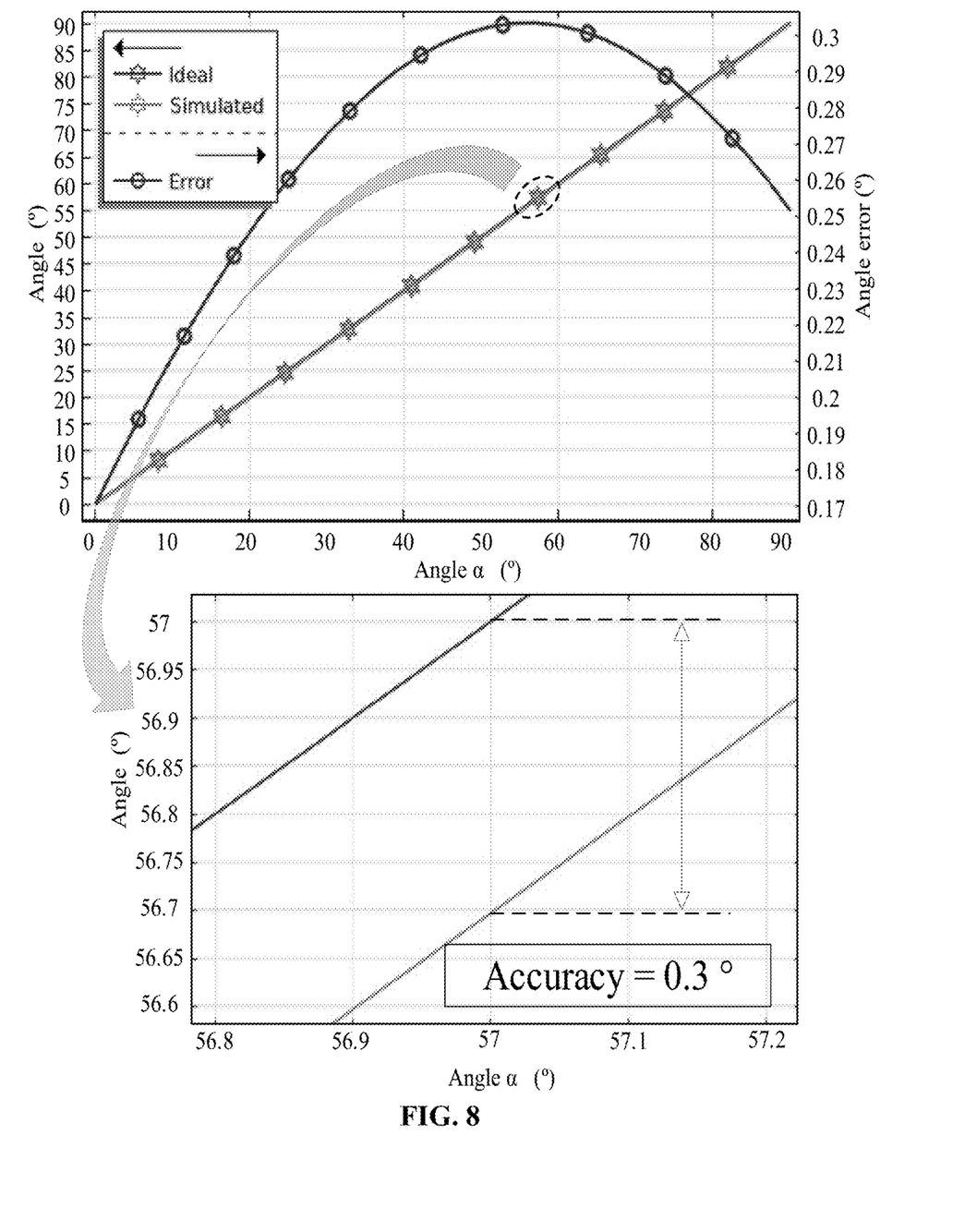
FIG. 8 shows a comparison of the measured values and the actual values of a magnetic field tilt angle α.

FIG. 8 represents the result of a comparison of the measured value for the angle α with the actual external field tilt angle as α is varied from 0° to 90° after the introduction of the offset in the application. The error between the simulated and actual values at 56° is 0.3°.

Figure 9:
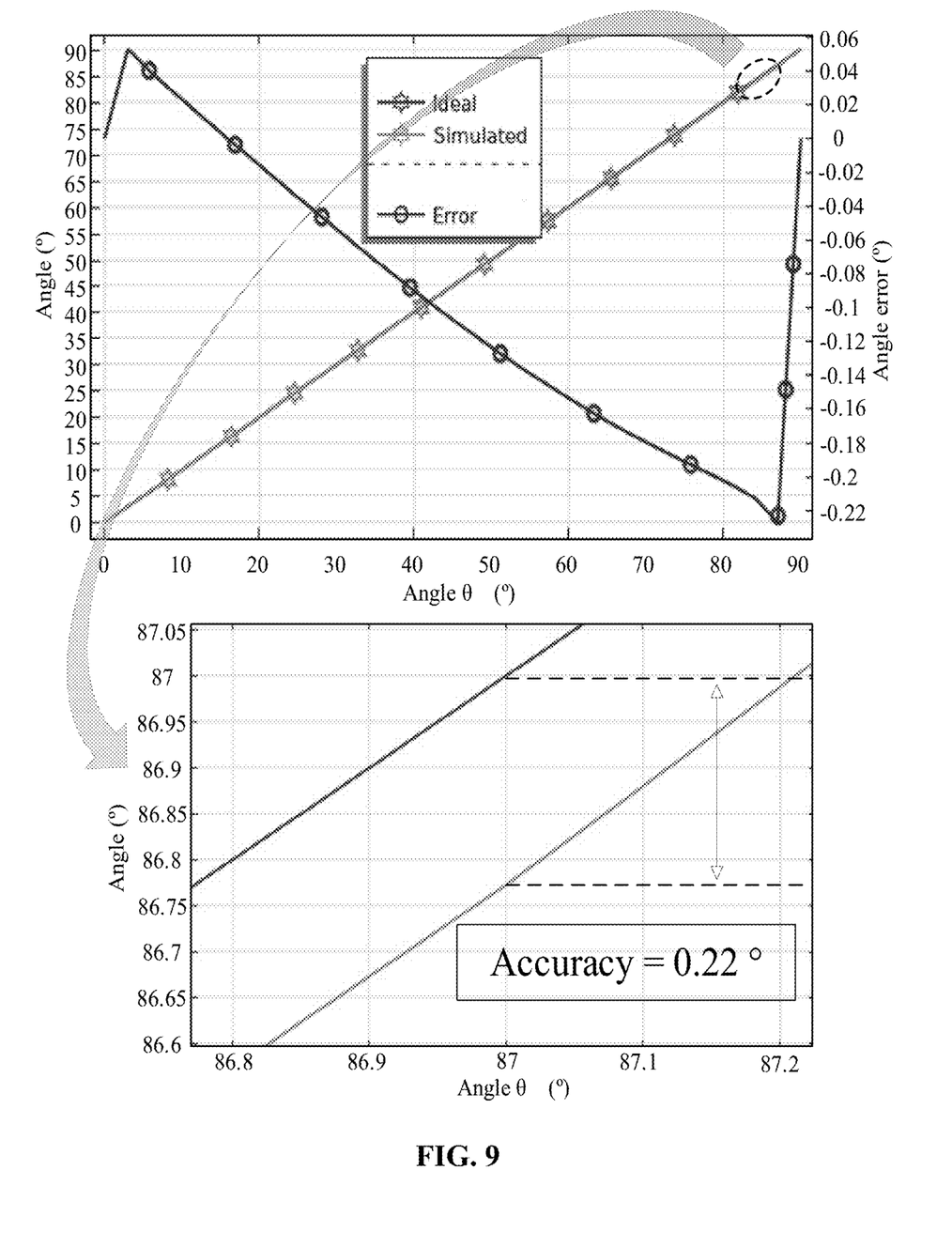
FIG. 9 shows a comparison of the measured values and the actual values of a magnetic field tilt angle θ.

FIG. 9 represents the result of a comparison of the measured value for the angle θ with the actual external field tilt angle as θ is varied from 0° C. to 90° after the introduction of the offset in the application. The error that exists between the simulated and actual values at 87° is 0.22°.

The implementation steps of the disclosure are only a preferred embodiment of the present three-axis Hall magnetic sensor, therefore, the equivalent evolution simulation method implemented according to the scope of the claims of the disclosure shall belong to the scope of the disclosure.

Compared with the three-axis Hall angle sensor in the related art, the structure of the disclosure, under the same simulation model and the same fault conditions, achieves the performance that the angle error between the direction of the measurement magnetic field and the xy plane is less than 0.15°, and the angle error between the projection of the magnetic field direction on the xy-plane and the x axis is less than 0.04°, thereby a better result can be obtained. Furthermore, in the disclosure, the N-well thickness change caused by a PN junction back-bias during the operation of the Hall element is considered, and the influence of the magnetic field in other directions in a transmission equation on an obtained Hall voltage is supplemented, and the obtained result is more accurate compared with the original solution. The disclosure achieves the performance that the angle error between the magnetic field direction and the xy-plane is less than 0.3°, and the angle error between the projection of the magnetic field direction on the xy-plane and the x-axis is less than 0.22°.

TABLE 1

Comparison of Three-axis Hall Angle Sensor

| Solution | Reference1 4 Horizontal + Magnetic Concentrator | Reference 2 1 Horizontal + 2 Vertical | The Disclosure 4 Horizontal + 8 vertical |
|---|---|---|---|
| Area (μm²) | π × 150 × 150 | / | 202 × 202 |
| Angle Error (°) | 0.8/1.2 | 0.4/0.5 | 0.3/0.22 |
| Initial angle error (°) | 0.12/1 | | 0.12/0.16 |

What is claimed is:

1. A three-axis Hall angle sensor, comprising: four horizontal Hall elements and eight vertical Hall elements disposed on a plane, wherein:
the eight vertical Hall elements are divided into two groups, an X-direction group and a Y-direction group, the X-direction group comprising four vertical Hall elements X1, X2, X3 and X4, and the Y-direction group comprising four vertical Hall elements Y1, Y2, Y3 and Y4; each vertical Hall element comprises four three-contact Hall components, and the four three-contact Hall components are connected end-to-end in series; the four horizontal Hall elements comprising Z1, Z2, Z3 and Z4 are in a 2×2 array arrangement; in the X-direction group, X1 and X2 are located on a left side of the four horizontal Hall elements; X2 is located between X1 and four horizontal Hall elements; X3 and X4 are located on a right side of the four horizontal Hall elements, and X3 is located between X4 and the four horizontal Hall elements;

X1 comprises the four three-contact Hall components, in which middle electrodes are $A_{X1}$, $B_{X1}$, $C_{X1}$ and $D_{X1}$ in sequence; X2 comprises the four three-contact Hall components, in which middle electrodes are $A_{X2}$, $B_{X2}$, $C_{X2}$, and $D_{X2}$ in sequence; X3 comprises the four three-contact Hall components, in which middle electrodes are $A_{X3}$, $B_{X3}$, $C_{X3}$ and $D_{X3}$ in sequence; X4 comprises the four three-contact Hall components, in which middle electrodes are $A_{X4}$, $B_{X4}$, $C_{X4}$ and $D_{X4}$ in sequence; when measuring an X-direction magnetic field, for a first vertical Hall element X1, applying a current bias between contact electrodes of $B_{X1}$ and $D_{X1}$, and measuring a Hall voltage $V_{HallX1}$ between contact electrodes of $A_{X1}$ and $C_{X1}$; for a second vertical Hall element X2, applying a current bias between contact electrodes of $B_{X2}$ and $D_{X2}$, and simultaneously measuring a Hall voltage $V_{HallX2}$ generated between $A_{X2}$ and $C_{X2}$; for a third vertical Hall element X3, applying a current bias between contact electrodes of $C_{X3}$ and $A_{X3}$, and measuring a Hall voltage $V_{HallX3}$ between contact electrodes of $B_{X3}$ and $D_{X3}$; for a fourth vertical Hall element X4, applying a current bias between the $A_{X4}$ and $C_{X4}$ contact electrodes, and measuring a Hall voltage $V_{HallX4}$ between contact electrodes of $D_{X4}$ and $B_{X4}$;

in a Y direction, vertical Hall elements Y1 and Y2 are located on an upper side of the four horizontal Hall elements, and Y2 is located between Y1 and the four horizontal Hall elements; vertical Hall elements Y3 and Y4 are located on a lower side of the four horizontal Hall elements, and Y3 is located between Y4 and the four horizontal Hall elements; Y1 comprises the four three-contact Hall components, in which middle electrodes are $A_{Y1}$, $B_{Y1}$, $C_{Y1}$ and $D_{Y1}$ in sequence; Y2 comprises the four three-contact Hall components, in which intermediate electrodes are $A_{Y2}$, $B_{Y2}$, $C_{Y2}$ and $D_{Y2}$ in sequence; Y3 comprise the four three-contact Hall components, in which intermediate electrodes are $A_{Y3}$, $B_{Y3}$, $C_{Y3}$ and $D_{Y3}$ in sequence; Y4 comprises the four three-contact Hall components, and intermediate electrodes are $A_{Y4}$, $B_{Y4}$, $C_{Y4}$ and $D_{Y4}$ in sequence;

when measuring a magnetic field in the Y direction, the following steps are taken: for a first vertical Hall element Y1, applying a current bias between $D_{Y1}$ and $B_{Y1}$, and measuring a Hall voltage $V_{HallY1}$ between contact electrodes of $A_{Y1}$ and $C_{Y1}$; for a second vertical Hall element Y2, applying a current bias between $B_{Y2}$ and $D_{Y2}$, and simultaneously measuring a sensing Hall voltage $V_{HallY2}$ generated between $A_{Y2}$ and $C_{Y2}$; for a third vertical Hall element Y3, applying a current bias between contact electrodes of $A_{Y3}$ and $C_{Y3}$, and measuring a Hall voltage $V_{HallY3}$ between contact electrodes of $D_{Y3}$ and $B_{Y3}$; for a fourth vertical Hall element Y4, applying a current bias between the $B_{Y4}$ and $D_{Y4}$ contact electrodes, then measuring a Hall voltages $V_{HallY4}$ between contact electrodes of $C_{Y4}$ and $A_{Y4}$;

each horizontal Hall element comprises four electrodes: A, B, C and D; a first horizontal Hall element Z1 is applied with a bias current between electrodes $A_{Z1}$ and $C_{Z1}$, and measuring a Hall voltage $V_{HallZ1}$ generated between electrodes $D_{Z1}$ and $B_{Z1}$; for a second horizontal Hall element Z2, applying a current bias between electrodes $B_{Z2}$ and $D_{Z2}$, then measuring a Hall voltage $V_{HallZ2}$ between electrodes $A_{Z2}$ and $C_{Z2}$; for a third horizontal Hall element Z3, applying a current bias between electrodes $C_{Z3}$ and $A_{Z3}$, then measuring a Hall voltage $V_{HallZ3}$ between electrodes $B_{Z3}$ and $D_{Z3}$; for a fourth horizontal Hall element Z4, applying a current bias between electrodes $D_{Z4}$ and $B_{Z4}$, and measuring a Hall voltage $V_{HallZ4}$ between electrodes $C_{Z4}$ and $A_{Z4}$; and the four identical Hall elements, Z1, Z2, Z3, Z4, are connected together by orthogonal coupling.

2. The three-axis Hall angle sensor of claim 1, wherein a current transmission equation of the three-axis Hall angle sensor $J_n$ is:

$$J_n = J_{n0} \cdot M \tag{1}$$

$$M = \frac{1}{1+a^2+b^2+c^2}\begin{pmatrix} 1+a^2 & ab-c & ca+b \\ c+ab & 1+b^2 & bc-a \\ ca-b & a+bc & 1+c^2 \end{pmatrix} \tag{2}$$

$$a = \mu_H \cdot B_X \tag{3}$$

$$b = \mu_H \cdot B_Y \tag{4}$$

$$c = \mu_H \cdot B_Z \tag{5}$$

where $J_{n0}$ represents a zero magnetic field electron current density, $\mu_H = r \cdot \mu$ and represents a Hall mobility of electrons, r is a Hall coefficient, μ represents an electron mobility, and $B_X$, $B_Y$, $B_Z$ respectively represent magnetic field components in X, Y and Z directions.

\* \* \* \* \*